United States Patent
Ito (10) Patent No.: US 10,486,198 B2
(45) Date of Patent: *Nov. 26, 2019

(54) PARTICLE SORTING APPARATUS, SYSTEM, AND METHOD

(71) Applicant: SONY CORPORATION, Tokyo (JP)

(72) Inventor: Tatsumi Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,056

(22) Filed: Nov. 13, 2017

(65) Prior Publication Data

US 2018/0126421 A1 May 10, 2018

Related U.S. Application Data (63) Continuation of application No. 14/223,549, filed on Mar. 24, 2014, now Pat. No. 9,855,587.

(30) Foreign Application Priority Data

Apr. 4, 2013 (JP) .................................. 2013-078212

(51) Int. Cl.
| | |
|---|---|
| B07C 5/342 | (2006.01) |
| F16K 99/00 | (2006.01) |
| B07C 5/34 | (2006.01) |

(52) U.S. Cl.
CPC ............ B07C 5/342 (2013.01); B07C 5/3416 (2013.01); F16K 99/0001 (2013.01); F16K 99/0028 (2013.01)

(58) Field of Classification Search
CPC .. B07C 5/02; B07C 5/34; B07C 5/342; B07C 5/3416; F16K 99/0001; F16K 99/0028
See application file for complete search history.

(56) References Cited

U.S. PATENT DOCUMENTS

| | | | |
|---|---|---|---|
| 8,358,412 B2 | 1/2013 | Kanda | |
| 8,487,273 B2 | 7/2013 | Ito et al. | |
| (Continued) | | | |

FOREIGN PATENT DOCUMENTS

| | | |
|---|---|---|
| CN | 101382499 A | 3/2009 |
| CN | 102564925 A | 7/2012 |
| (Continued) | | |

OTHER PUBLICATIONS

State Intellectual Propert Office of the People's Republic of China, Office Action for CN Patent Application No. 2014101237620 (related to above-captioned patent application), dated Apr. 12, 2017.
(Continued)

*Primary Examiner* — Charles A Fox
*Assistant Examiner* — Kalyanavenkateshware Kumar
(74) *Attorney, Agent, or Firm* — K&L Gates LLP (57) ABSTRACT

A particle sorting apparatus is provided. The particle sorting apparatus includes a first light irradiating unit including a first mirror and a first light source for irradiating a first light to particles flowing through a flow path at a first position; a second light irradiating unit including a second mirror and a second light source configured to irradiate a second light to particles flowing through the flow path at a second position which is different from the first position; a light detecting unit is configured to detect a light emitted from the particles; a sorting unit; and a sorting control unit configured to control sorting of the particles based on data of the particles detected at the light detecting unit and an arrival time associated with a time difference between a light from the first light irradiating unit and a light from the second light irradiating unit; wherein the flow path and the sorting unit are provided within a microchip.

20 Claims, 8 Drawing Sheets

(56) References Cited

U.S. PATENT DOCUMENTS

2012/0078531 A1   3/2012  Lo et al.
2013/0050698 A1   2/2013  Muraki et al.

FOREIGN PATENT DOCUMENTS

| JP | 2009-063305 | 3/2009 |
|----|-------------|--------|
| JP | 2009-109218 | 5/2009 |
| JP | 2009-145213 | 7/2009 |
| JP | 2009-162650 | 7/2009 |
| JP | 2010-038866 | 2/2010 |
| JP | 2011-521228 A | 7/2011 |
| JP | 2012-127922 | 7/2012 |
| WO | 2009/078307 A1 | 6/2009 |

OTHER PUBLICATIONS

Japanese Office Action dated Aug. 28, 2018 in corresponding Japanese Application No. 2017-150212.
Chinese Office Action dated Jul. 3, 2019 for Chinese Patent Application No. 2017114317858 and English translation of same. 19 pages.

| Event No. | Trigger Ch. | Trigger Time | | CH1 Detection Time | CH2 Detection Time |
|---|---|---|---|---|---|
| Sorting Time | | Gate Flag | Sort Flag | | |
| Ch1 Area | | | | | |
| Ch2 Area | | | | | |
| Ch3 Area | | | | | |
| Ch4 Area | | | | | |
| Ch1 Height | | | | | |
| Ch2 Height | | | | | |
| Ch3 Height | | | | | |
| Ch4 Height | | | | | |
| Ch1 Width | | | | | |
| Ch2 Width | | | | | |
| Ch3 Width | | | | | |
| Ch4 Width | | | | | |

Acquisition event
of former particle

FIG 7B

Non-acquisition event
of former particle

——— Signal derived from particles to be sorted
- - - - Signal derived from particles to be not sorted

FIG.8

PARTICLE SORTING APPARATUS, SYSTEM, AND METHOD

CROSS REFERENCES TO RELATED APPLICATIONS

The present application is a continuation of U.S. application Ser. No. 14/223,549 filed Mar. 24, 2014 which claims priority to Japanese Priority Patent Application JP 2013-078212 filed in the Japan Patent Office on Apr. 4, 2013, the entire content of which is hereby incorporated by reference.

BACKGROUND

The present disclosure relates to a particle sorting apparatus and a particle sorting method. More particularly, the present disclosure relates to a technology for sorting and recovering particles based on a result of an optical analysis.

In the related art, to analyze biologically-relevant particles such as cells, microorganisms and liposomes, an optical measuring method using a flow cytometry (flow cytometer) is utilized. The flow cytometer is an analyzer for irradiating particles flowing through a flow path formed within a flow cell or a microchip with light and detecting fluorescence or a scattered light emitted from each particles.

One of the flow cytometers has a function to sort and recover the particles having a specific property based on a result of analysis. In particular, an apparatus for sorting cells is called as "a cell sorter". As a sorting method used in the cell sorter, a liquid droplet charging method of charging and separating liquid droplets containing particles is mainly used (for example, see Japanese Patent Application Laid-open No. 2009-145213). In an apparatus using the liquid droplet charging method, a fluid discharged from a flow cell or a microchip is liquefied, and liquid droplets are positively (+) or negatively (−) charged, changed their traveling directions by a deflection plate and recovered by a predetermined container.

However, the sorting method such as the liquid droplet charging method where the liquid droplets are formed is undesirably affected by a change in a measurement environment or a liquid pressure change. A particle sorting apparatus where particles are sorted within a microchip has then been proposed in the related art (see Japanese Patent Application Laid-open No. 2012-127922). The particle sorting apparatus described in Japanese Patent Application Laid-open No. 2012-127922 sucks particles to be recovered into a negative pressure suction unit within the microchip. Therefore, forming liquid droplets and charging are unnecessary, whereby stable sorting can be done at a high speed without damaging the particles.

The particle sorting apparatus in the related art is generally controlled to acquire the particles to be recovered after a predetermined time from detection at a light detecting unit. The time to acquire the particles from detection is set in advance based on a liquid pressure, a distance from a detection position to a sorting position, etc. However, by the controlling method where an arrival time is fixed in this way, a purity of recovered particles or an acquisition rate is undesirably lowered, once a flow speed of the particles is changed.

On the other hand, the apparatus described in Japanese Patent Application Laid-open No. 2009-145213 detects a migration speed of each particle and controls a timing to charge each particle based on the migrating speed in order to prevent the purity from lowering due to the change in the flow speed of the particles. In the liquid droplet charging method, it may only determine that the respective particles belong to which liquid droplets. However, in the apparatus for sorting within the microchip, fluid mechanism characteristics may be considered as well as attributes of adjacent particles. Here, the "attributes of particles" mean that the particles are to be sorted or not, and the "fluid mechanism characteristics" mean a counter flow generated when a pulse signal is risen for acquisition operation.

In the liquid droplet charging method, the liquid droplets are controlled. However, in the method for sorting within the microchip described in Japanese Patent Application Laid-open No. 2012-127922, the respective particles should be controlled. In addition, there are differences in a path to arrive at an acquisition position and a factor affecting the arrival of the particles between the liquid droplet charging method and the method for sorting within the microchip. For the above reasons, the technology described in Japanese Patent Application Laid-open No. 2009-145213 is not simply applied to the apparatus for sorting within the microchip described in Japanese Patent Application Laid-open No. 2012-127922.

It is desirable to provide a particle sorting apparatus and a particle sorting method for effectively sorting particles within microchip.

SUMMARY

According to an embodiment of the present disclosure, there is provided a particle sorting apparatus, including:

an excited light irradiating unit for irradiating an excited light to particles flowing through a flow path;

a light irradiating unit for detecting a speed for irradiating a light for detecting a speed to the particles at a position different from the excited light;

a light detecting unit for detecting a light emitted from the particles;

a calculating unit of an arrival time for individually calculating an arrival time of each particle at a sorting unit being communicating with the flow path from a detection time difference between the light derived from the excited light and the light derived from the light for detecting a speed; and a sorting control unit for controlling sorting of the particles;

the flow path and the sorting unit being disposed within a microchip, and the sorting control unit determining whether or not the particles are recovered based on data of each particle detected at the light detecting unit and the arrival time calculated at the calculating unit of an arrival time.

The sorting control unit calculates an arrival time difference of former and latter particles, and determines that the particles are not recovered when the arrival time difference is under a threshold value.

The light for detecting a speed may have a wavelength different from a wavelength of the exited light.

In this case, the calculating unit of the arrival time can calculate the arrival time of each particle from the detection time difference between a scattered light derived from the excited light and a scattered light derived from the light for detecting a speed.

In addition, the excited light irradiating unit may include two or more light sources emitting lights having different wavelengths.

The sorting unit may have a negative pressure suction unit being communicated with the flow path.

In this case, the sorting control unit controls an operation of the negative pressure suction unit based on the data of the respective particles detected at the light detecting unit and the arrival time calculated at the calculating unit of an arrival time.

Also, the sorting control unit can control a timing to recover the particles by the sorting unit based on the data of the respective particles detected at the light detecting unit and the arrival time calculated at the calculating unit of an arrival time.

According to an embodiment of the present disclosure, there is provided a method of sorting particles, including:

irradiating an excited light to particles flowing through a flow path disposed within a microchip;

irradiating a light for detecting a speed to the particles at a position different from the excited light;

detecting a light emitted from the particles;

individually calculating an arrival time of each particle at a sorting unit disposed within the microchip and being communicating with the flow path from a detection time difference between the light derived from the excited light and the light derived from the light for detecting a speed; and sort-controlling to determine whether or not the particles are recovered based on data of each particle detected by the light detection and the arrival time calculated by the arrival time calculation.

The sorting control may include calculating an arrival time difference of former and latter particles, and determining that the particles are not recovered when the arrival time difference is under a threshold value.

The light for detecting a speed having a wavelength different from a wavelength of the exited light can be used.

In this case, the calculation of the arrival time may include calculating the arrival time of each particle from the detection time difference between a scattered light derived from the excited light and a scattered light derived from the light for detecting a speed.

The irradiation of an excited light can emit different wavelengths from two or more light sources.

Also, the sorting unit may have a negative pressure suction unit being communicated with the flow path. In this case, the sorting control includes controlling an operation of the negative pressure suction unit based on the data of the respective particles detected by the light detection and the arrival time calculated by the arrival time calculation.

In addition, the sorting control can include controlling a timing to recover the particles by the sorting unit based on the data of the respective particles detected by the light detection and the arrival time calculated by the arrival time calculation.

According to the present disclosure, the sorting control unit determines whether or not the particles are recovered based on data of each particle detected at the light detecting unit and the arrival time calculated at the calculating unit of an arrival time. Thus, acquisition properties can be improved.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, an embodiment of the present disclosure will be described with reference to the drawings.

The embodiments of the present disclosure will be described in the following order.

1. First Embodiment (Example of Particle Sorting Apparatus including Sorting Control Unit)
2. Alternative Embodiment of First Embodiment (Example of Particle Sorting Apparatus including Mode Switching Function)

1. First Embodiment

Figure 1:
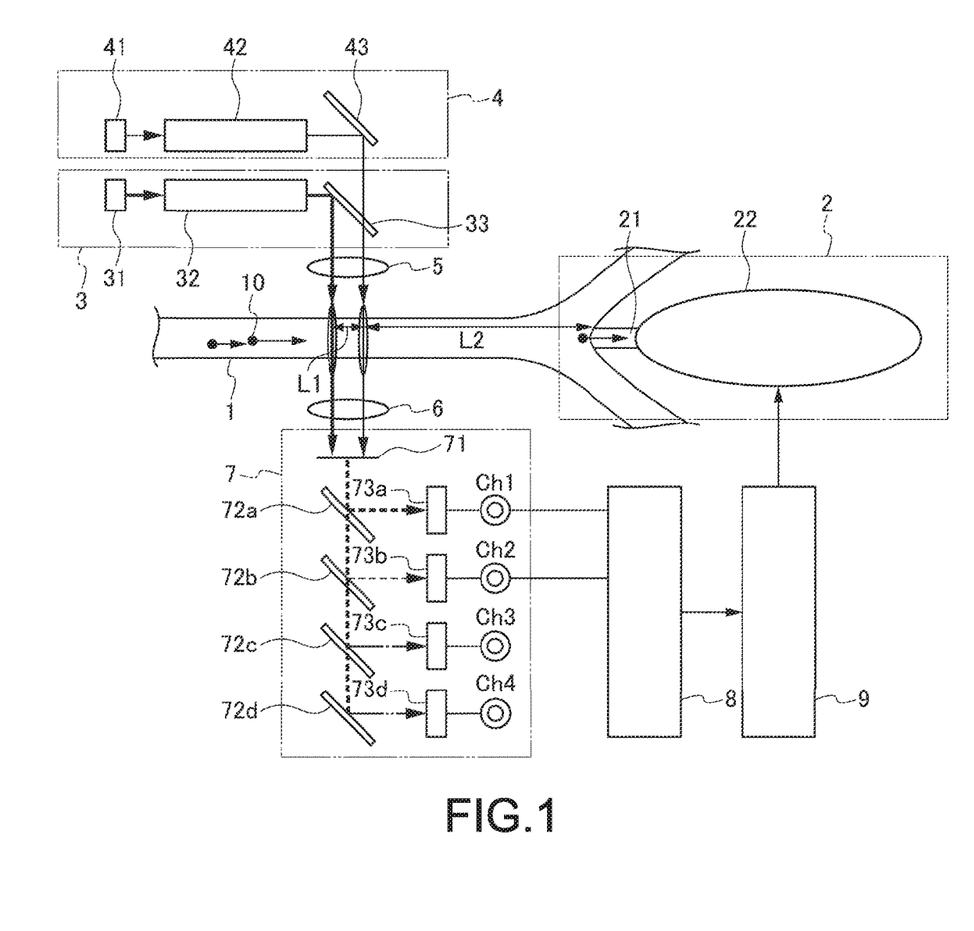
FIG. 1 is a diagram for schematically showing a configuration of a particle sorting apparatus according to a first embodiment of the present disclosure.
Figure 2:
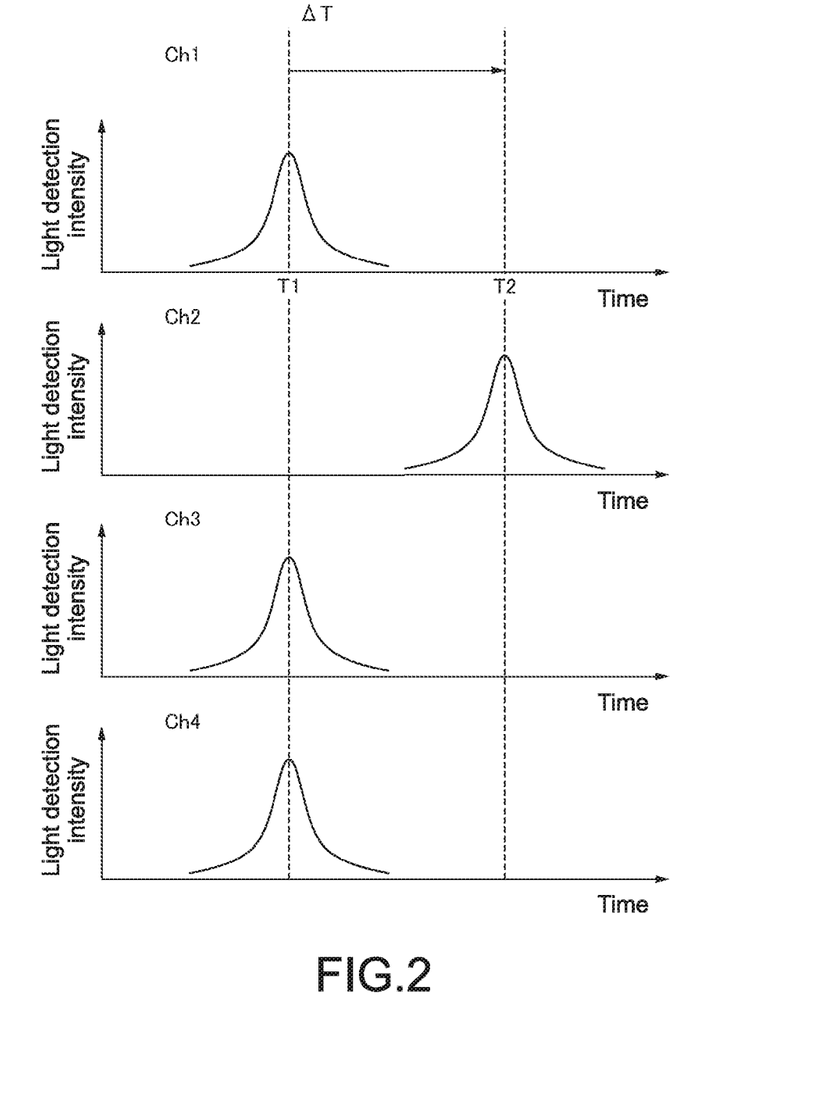
FIG. 2 shows graphs of detection data at a light detecting unit 7 shown in FIG. 1.

Firstly, a particle sorting apparatus 1 according to a first embodiment of the present disclosure will be explained. FIG. 1 is a diagram for schematically showing a configuration of the particle sorting apparatus 1 according to the first embodiment of the present disclosure. FIG. 2 shows graphs of detection data at a light detecting unit 7.

[Overall Configuration of Apparatus]

As shown in FIG. 1, the particle sorting apparatus 1 according to the first embodiment sorts and recovers particles 10 based on a result of an optical analysis. The particle sorting apparatus 1 includes a flow path 1, a sorting unit 2, an excited light irradiating unit 3, a light irradiating unit for detecting a speed 4, a light detecting unit 7, a calculating unit of an arrival time 8 and a sorting control unit 9, for example.

[About Particles 10]

Examples of the particles 10 analyzed and sorted by the particle sorting apparatus 1 according to the first embodiment include biologically-related particles such as cells, microorganisms and ribosomes; and synthesized particles such as latex particles, gel particles and industrial particles.

Examples of the biologically-related particles include chromosome, ribosome, mitochondoria and organella (cell organelle) that are constituents of a variety of cells. Examples of the cells include plant cells, animal cells and blood cells. Examples of the microorganisms include bacteria such as *Bacillus coli*, viruses such as a tabacco mosaic virus, and fungi such as Yeast. Also, the biologically-related particles can involve biologically-related polymers such as nucleic acids, proteins and composites thereof.

The industrial particles include organic polymer materials, inorganic polymer materials or metal materials, for example. As the organic polymer materials, polystyrene, styrene-divinyl benzene, polymethyl methacrylate and the like can be used. As the inorganic materials, glass, silica, magnetic materials and the like can be used. As the metal materials, gold colloid, aluminum and the like can be used.

In general, shapes of the particles are spherical, but may be non-spherical. Seizes and masses of the particles are not especially limited.

[Flow Path 1]

The flow path 1 is formed within the microchip, into which a liquid (a sample liquid) containing the particles 10 to be sorted is fed. The microchip including the flow path 1 can be formed of glass or a variety of plastics (PP, PC, COP, PDSM or the like). Desirably, the material of the microchip transmits the light irradiated from the excited light irradiating unit 3 and the light irradiating unit for detecting a speed 4, emits less autofluorescence, has small wavelength dispersion, and induces less optical errors.

The flow path 1 can be shaped by wet-etching or dry-etching a glass substrate, nanoimprinting, injection molding or machining a plastic substrate. The microchip can be formed by sealing the substrate in which the flow path 1 is shaped with a substrate made of the same material or a different material.

FIG. 1 shows only an area where the flow path 1 is irradiated with the excited light or the light for detecting a speed. At an upstream side thereof, a flow path for feeding the sample liquid containing the particles 10 and a pair of flow paths for feeding a sheath liquid may be provided. In this case, the flow paths for feeding a sheath liquid meet at both sides of the flow path for feeding the sample liquid. At a downstream side of a meeting point, the flow path 1 is provided. Within the flow path 1, the sheath flow surrounds the sample flow, the liquid flows in a state that a laminar flow is formed, and the particles 10 in the sample liquid flow in an almost row to the flow direction.

[Sorting Unit 2]

The sorting unit 2 sorts the particles 10 to be sorted, and is formed within the microchip. The sorting unit 2 is communicated with the flow path 1 at a downstream side, and is configured of a suction flow path 21 and a negative pressure suction unit 22. The configuration of the negative pressure suction unit 22 is not especially limited as long as microparticles to be sorted can be sucked at a predetermined timing. For example, the negative pressure suction unit 22 may have the configuration that a volume of the negative pressure suction unit 22 can be expanded by an actuator (not shown) at any timing.

[Excited Light Irradiating Unit 3]

The excited light irradiating unit 3 includes a light source 31 for generating an excited light such as a laser light, an optical system 32 for shaping a spot shape and a mirror 33. The excited light irradiating unit 3 irradiates the particles 10 flowing through the flow path 1 formed within the microchip with the excited light. In FIG. 1, one light source 31 is shown. However, the present disclosure is not limited thereto, and two or more light sources 31 may be provided. In such a case, the respective light sources 31 may emit lights having different wavelengths.

[Light Irradiating Unit for Detecting Speed 4]

The light irradiating unit for detecting a speed 4 includes a light source 41 for generating a light for detecting a speed, an optical system 42 for shaping a spot shape and a mirror 43. The light irradiating unit for detecting a speed 4 irradiates the particles 10 flowing through the flow path 1 formed within the microchip with the light for detecting a speed at a position different from the above-mentioned excited light. The light for detecting a speed may have the same wavelength as the exited light. From the standpoint of simplification of the apparatus configuration, the light for detecting a speed desirably has the wavelength different from the wavelength of the exited light.

[Light Detecting Unit 7]

The light detecting unit 7 detects a light (a scattered light, fluorescence) generated from the particles 10 flowing through the flow path 1, and includes a zero-order light removing member 71, mirrors 72a to 72d, light detecting units 73a to 73d. As the light detecting units 73a to 73d, PMT (Photo Multiplier Tube) or an area imaging sensor such as a CCD or a CMOS element can be used.

In the light detecting unit 7, the light detecting unit 73a detects a forward-scattered light derived from the excited light, the light detecting unit 73b detects a scattered light derived from the light for detecting a speed, and the light detecting units 73c, 73d detect fluorescence. The light to be detected in the light detecting unit 7 is not limited thereto, and a side scattered light, a Rayleigh scattered light, or a Mie scattered light may be detected. The light detected at the light detecting unit 7 is converted into an electrical signal.

[Calculating Unit of Arrival Time 8]

The calculating unit of an arrival time 8 individually calculates an arrival time of each particle 10 at the sorting unit 2 being communicated with the flow path from a detection time difference between the light derived from the excited light and the light derived from the light for detecting a speed. A method of calculating the arrival time is not especially limited. For example, the arrival time of each particle 10 is calculated from the detection time difference between the forward-scattered light (data of Ch1) derived from the excited light detected at the light detecting unit 7 and the forward-scattered light (data of Ch2) derived from the light for detecting a speed, as shown in FIG. 2.

Here, the arrival time to the sorting unit 2 can be calculated by a simple linear approximate expression represented by the following numerical expression 1. In the numerical expression 1, L1 denotes a distance from a position for irradiating the excited light to a position for irradiating the light for detecting a speed, and L2 denotes a distance from the position for irradiating the light for detecting a speed to the suction flow path 21 of the sorting unit 2 (see FIG. 1). In the numerical expression 1, T1 denotes the detection time of the light derived from the excited light, T2 denotes the detection time of the light derived from the light for detecting a speed, and (T1−T2) denotes a difference between these detection times (see FIG. 2).

$$(\text{Arrival time}) = (L2/L1) \times (T1 - T2) \qquad [\text{Numerical Expression 1}]$$

A method of calculating the arrival time to the sorting unit 2 is not limited to the linear approximate expression represented by the numerical expression 1. Other calculation method such as a polynomial approximate expression and a look-up table may be used.

[Sorting Control Unit 9]

The sorting control unit 9 controls sorting of the particles 10, and determines whether or not the particles 10 are recovered based on the data of the respective particles 10 detected at the light detecting unit 7 and the arrival time calculated at the calculating unit of an arrival time 8. The sorting control unit 9 calculates an arrival time difference of "former" and "latter" particles 10, and determines that the particles having the calculated arrival time difference under a threshold value preliminary set will "not be recovered". Thus, when the particles 10 flow closely each other, the former particles or the latter particles to be recovered are prevented from being entrained and acquired wrongly.

In addition, the sorting control unit 9 controls a timing to recover the particles 10 by the sorting unit 2, for example, by controlling an operation of the negative pressure suction unit 22, based on the above-described determination result.

In this way, an acquisition accuracy of the particles to be intended can be improved to sort the particles with higher purity or at higher acquisition rate.

[Operation]

Next, an operation of the particle sorting apparatus of this embodiment will be described. When the particles are sorted by the particle sorting apparatus of this embodiment, the sample liquid containing the particles to be sorted is fed into a sample inlet disposed within the microchip, and the sheath liquid is fed into a sheath inlet disposed within the microchip. Then, the particles 10 flowing through the flow path 1 are irradiated with the excited light and the light for detecting a speed at a position different from that of the exited light. In this case, as shown in FIG. 1, the excited light and the light for detecting a speed may be collected by one light collecting lens 5 to irradiate the particles 10, but may be collected by different light collecting lenses.

Next, the light detecting unit 7 detects the light emitted from each particle 10, and the calculating unit of the arrival time 8 individually calculates the arrival time of each particle 10 at the sorting unit 2 from the detection time difference between the light derived from the excited light and the light derived from the light for detecting a speed. In this case, as shown in FIG. 1, the light derived from the excited light and the light derived from the light for detecting a speed may be collected by one light collecting lens 6 to the zero-order light removing member 71, but may be collected by different light collecting lenses.

Thereafter, the sorting control unit 9 determines whether or not the particles 10 are recovered based on the data of the respective particles 10 detected at the light detecting unit 7 and the arrival time calculated at the calculating unit of an arrival time 8. Based on the determination result, the sorting control unit 9 controls the timing to recover the particles 10 by the sorting unit 2. For example, when the sorting unit 2 includes the negative pressure suction unit 22 being communicated with the flow path 1, the sorting control unit 9 controls the operation of the actuator disposed at the negative pressure suction unit 22.

As described in detail, the particle sorting apparatus of this embodiment calculates the arrival time of each particle to the sorting unit, and determines whether or not the particles are recovered in view not only of the optical characteristic data of each particle but of the arrival time to the sorting unit. In this way, irrespective of a flowing position or a flowing status of each particle, the particles can be sorted with higher purity or at higher acquisition rate. As a result, acquisition properties can be improved as compared to the particle sorting apparatus in the related art.

As the particle sorting apparatus of this embodiment calculates the arrival time of each particle, a flow rate is less affected by a change in an environment temperature or a residual quantity in a supply tank. Thus, a highly precise control of the flow rate is unnecessary so that an inexpensive pressure control device can be used and a parts control of the flow path and an assembly accuracy control can be simplified. As a result, the manufacturing costs can be decreased.

2. Alternative Embodiment of First Embodiment

Next, a particle sorting apparatus according to an alternative embodiment of the first embodiment of the present disclosure will be explained. In the particle sorting apparatus according to the alternative embodiment, when the determination whether or not the particles are recovered is done, a user can select either that the "purity" has priority or that the "acquisition rate" has priority.

Figure 3:
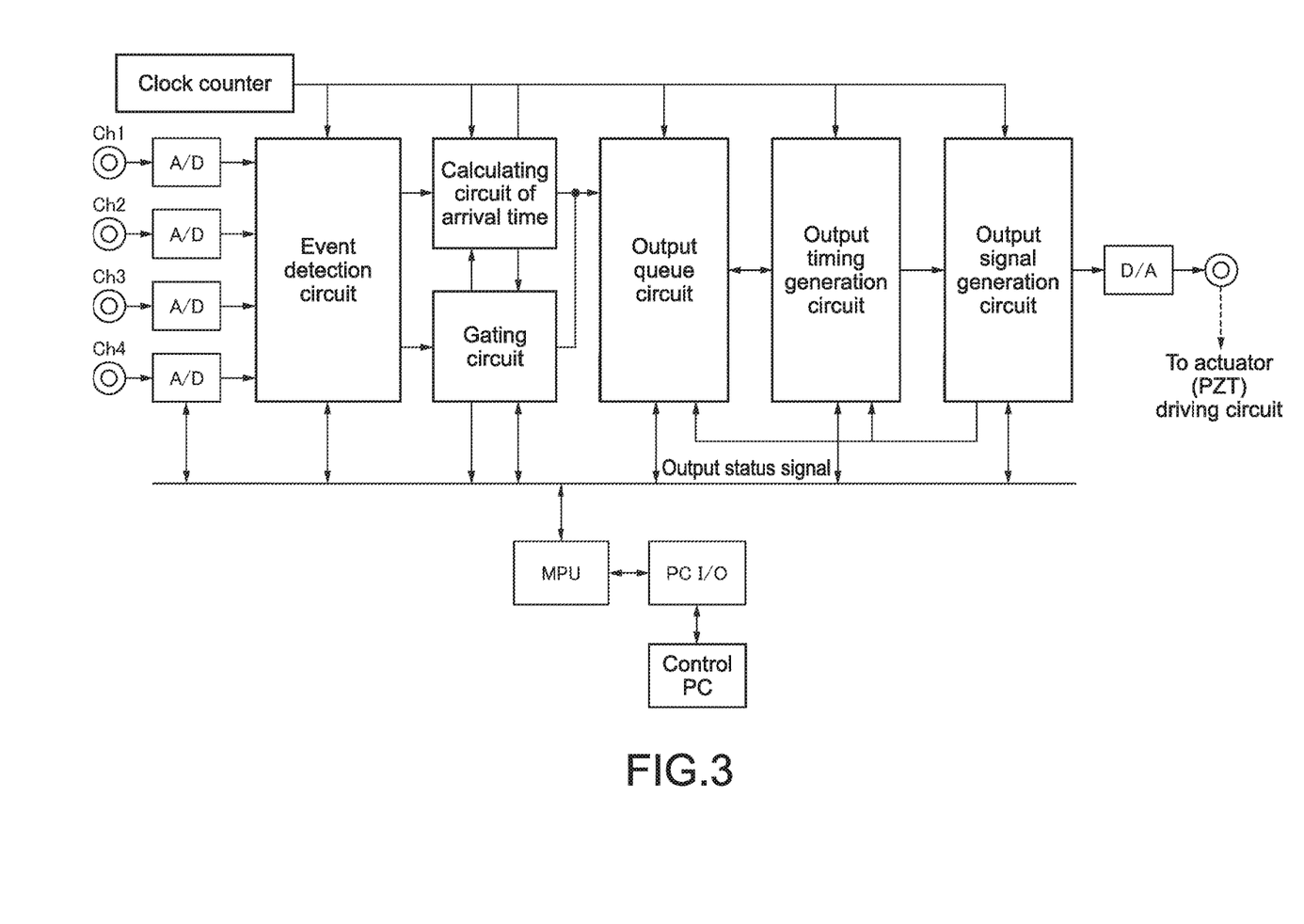
FIG. 3 is a block diagram showing a circuit configuration in a calculating unit of an arrival time 8 and a sorting control unit 9 of a particle sorting apparatus according to an alternative embodiment of the first embodiment of the present disclosure.
Figure 4A:
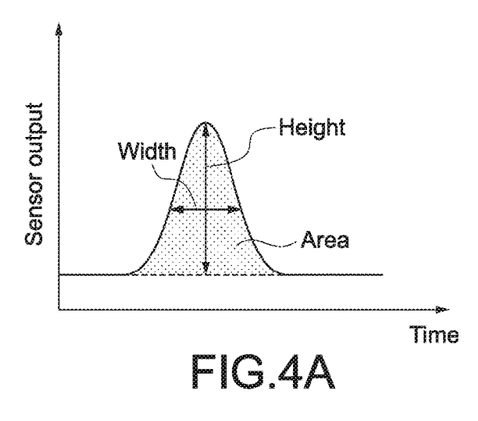
FIGS. 4A and 4B each shows a processing at an event detection circuit shown in FIG. 3.
Figure 4B:
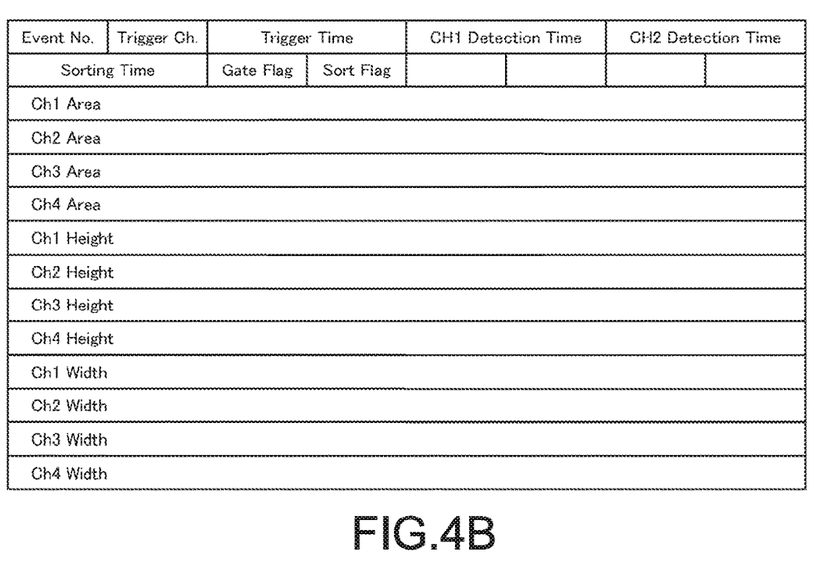
Figure 5A:
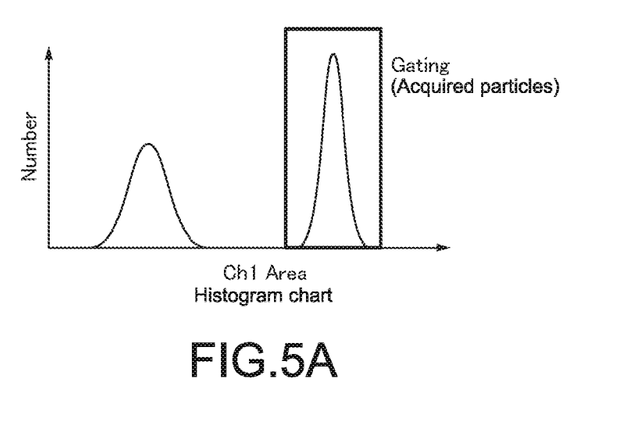
FIGS. 5A and 5B each shows a distance at a gating circuit shown in FIG. 3.
Figure 5B:
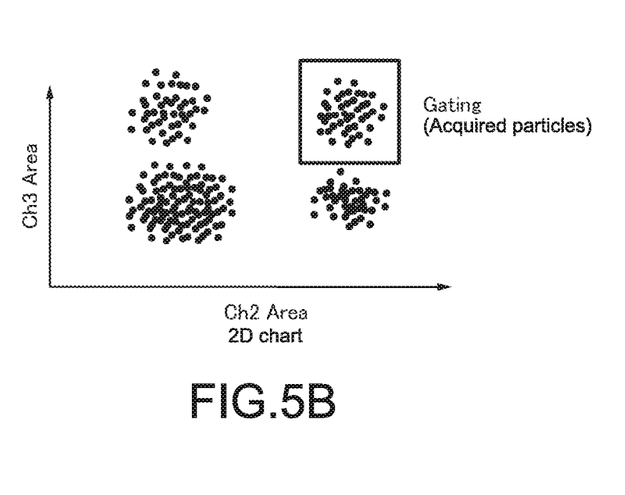

FIG. 3 is a block diagram showing a circuit configuration in the calculating unit of an arrival time 8 and the sorting control unit 9 of the particle sorting apparatus according to the alternative embodiment. FIGS. 4A and 4B are diagrams showing a processing at an event detection circuit. FIGS. 5A and 5B are diagrams showing a distance at a gating circuit. Sorting at a "purity priority mode" or an "acquisition rate priority mode" can be attained by the circuit configuration shown in FIG. 3, for example.

[Event Detection Circuit]

An event detection circuit reads a waveform of each Ch by applying a trigger with detection signals of Ch1 and Ch2 to calculate a width, a height and an area shown in FIG. 4A. As to detection data Ch1 concerning the forward-scattered light derived from the excited light and detection data Ch2 concerning the forward-scattered light derived from the light for detecting a speed, a time at a waveform center is calculated as the detection time.

Then, as shown in FIG. 4B, the event detection circuit correlates each particle 10 with the detection signals of Ch1 (the forward-scattered light derived from the excited light) and Ch2 (the forward-scattered light derived from the light for detecting a speed) acquired in time series, and packetizes the detection data (events) of the respective particles. A packet includes items that are updated as the subsequent processing is proceeded. Flag is basically 1/0, which corresponds to acquisition/non-acquisition determined by each logic. As the detection times, trigger times of Ch1 and Ch2 can be used.

[Calculating Circuit of Arrival Time]

A calculating circuit of an arrival time calculates the arrival time using the detection times (T1, T2) of the Ch1 and Ch2 from the above-described numerical expression 1, which will be a "sorting time" of an event packet.

[Gating Circuit]

A gating circuit determines "acquisition/non-acquisition" of the particles 10 based on the threshold value preliminary set, and sets "Gate Flag" of an event packet. For example, before starting a gating acquisition operation, GUI on a computer for controlling is used to plot a histogram chart shown in FIG. 5A or a 2D chart shown in FIG. 5B. A group of acquired particles (a particle group having intended properties) is geometrically bundled and is designated.

A parameter (threshold value) for determining the "acquisition/non-acquisition" may be any of the width, the height and the area of the detection data acquired in each Ch and a combination thereof.

[Output Queue Circuit]

An output queue circuit rearranges the detection data (the event) of each particle 10 in an arrival order to the sorting unit based on the arrival time to the sorting unit ("Sorting Time"). Thereafter, the "acquisition/non-acquisition" is determined depending on a sorting mode selected by the user such as the "purity priority mode" and the "acquisition rate priority mode". Based on the result, "Sort Flag" is set.

Figure 6:
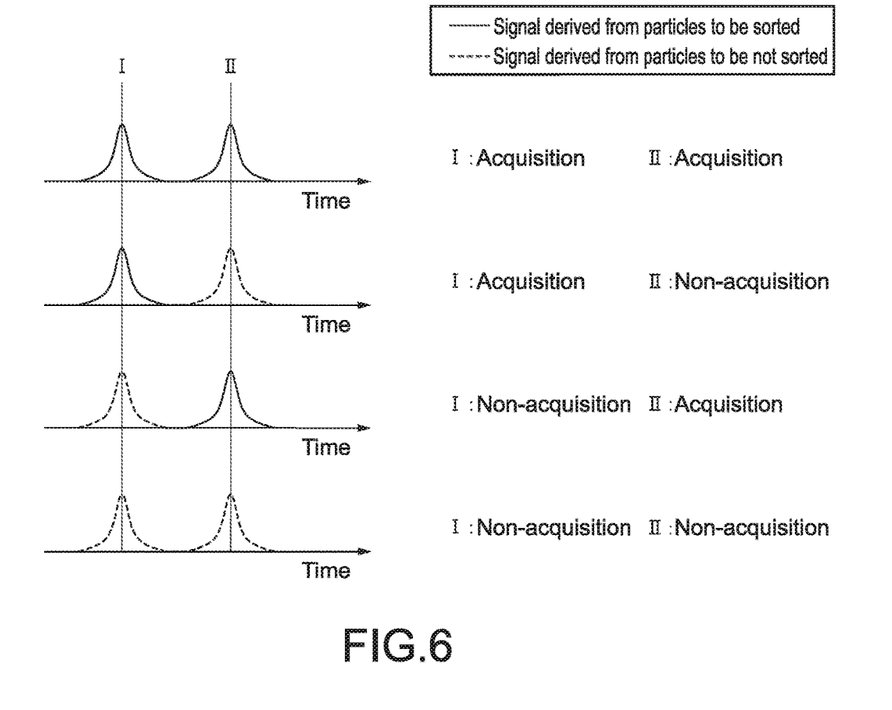
FIG. 6 shows an operation in an acquisition rate priority mode.
Figure 7A:
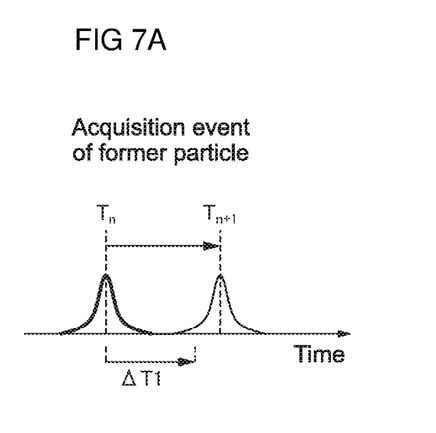
FIGS. 7A and 7B show detection data when the particles are adjacent.
Figure 7B:
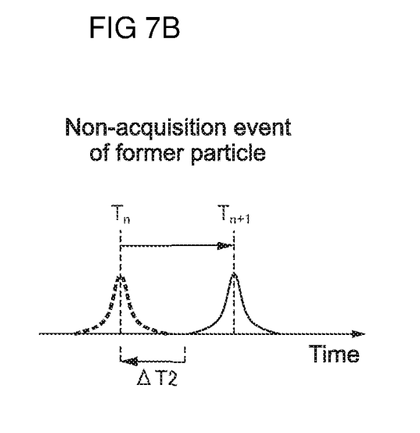
Figure 8:
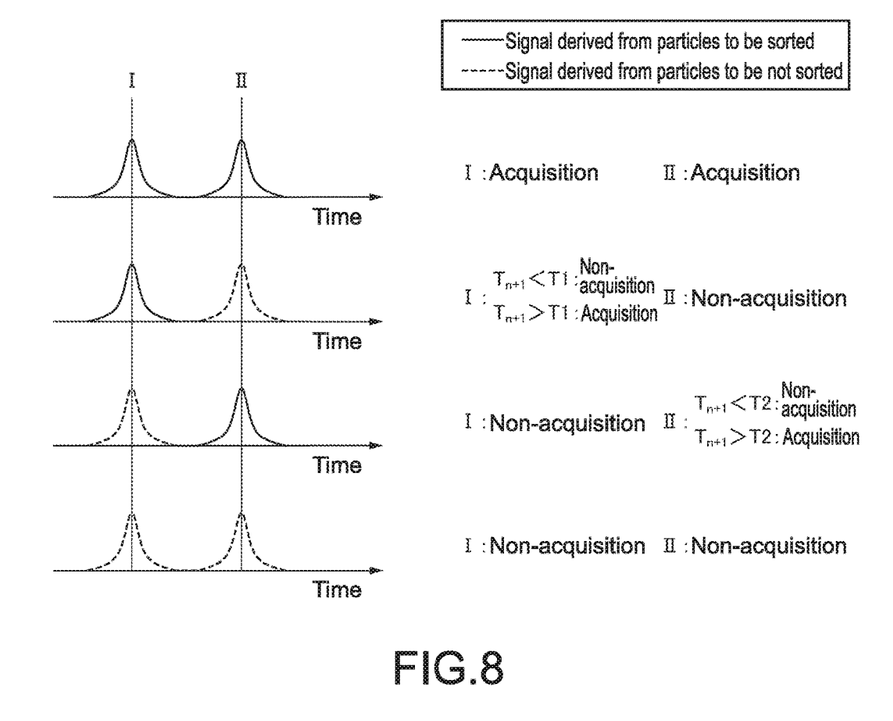
FIG. 8 shows an operation in a purity priority mode.

When the particles 10 flow closely each other, the former particles or the latter particles may be entrained by one acquisition operation, and a plurality of particles 10 may be recovered twice at the sorting unit 2. A method of determining the "acquisition/non-acquisition" is different in the case of the "purity priority mode" or the "acquisition rate priority mode", when the particles 10 are adjacent. FIG. 6 shows an operation in the "acquisition rate priority mode". FIGS. 7A and 7B show detection data when the particles are adjacent. FIG. 8 shows an operation in the purity priority mode.

In the "acquisition rate priority mode", the number of acquisition particles is increased even if the purity of the particles captured is decreased. As shown in FIG. 6, when the particles 10 flow closely each other, the particles to be sorted are recovered. In contrast, in the "purity priority mode", the purity of the particles captured is increased. When the acquisition particles and the non-acquisition particles are adjacent, the acquisition particles are daringly regarded as the "non-acquisition particles" in order to prevent the acquisition particles from capturing together with the non-acquisition particles.

In particular, in the "purity priority mode", as shown in FIG. 8, when the detection data (the event) of the particles 10 detected later is adjacent to that of the former particles 10, determination of the "acquisition/non-acquisition" in the former event will be again necessary. Here, $\Delta T1$ shown in FIG. 7A is a set value and a time to entrain the latter particle ($T1=Tn+\Delta T1$). Also, $\Delta T2$ is a set value and a time to entrain the former particle ($T2=Tn+\Delta T2$).

[Output Timing Generation Circuit]

An output timing generation circuit reads out an event time (Sorting time) acquired foremost at the output queue, compares it to a Clock Counter value and generates an output timing signal at the time.

[Output Signal Generation Circuit]

An output signal generation circuit detects the output timing signal, and outputs a waveform signal for controlling the actuation device at the sorting unit 2.

According to the particle sorting apparatus of the alternative embodiment, when the determination whether or not the particles are recovered is done, the user can select either that the "purity" has priority or that the "acquisition rate" has priority. As a result, sorting can be made depending on its purpose. The configurations and the advantages of the alternative embodiment other than the above are similar to those of the above-described first embodiment.

The present disclosure may have the following configurations.

(1) A particle sorting apparatus, including:
an excited light irradiating unit for irradiating an excited light to particles flowing through a flow path;
a light irradiating unit for detecting a speed for irradiating a light for detecting a speed to the particles at a position different from the excited light;
a light detecting unit for detecting a light emitted from the particles;
a calculating unit of an arrival time for individually calculating an arrival time of each particle at a sorting unit being communicating with the flow path from a detection time difference between the light derived from the excited light and the light derived from the light for detecting a speed; and
a sorting control unit for controlling sorting of the particles;
the flow path and the sorting unit being disposed within a microchip, and
the sorting control unit determining whether or not the particles are recovered based on data of each particle detected at the light detecting unit and the arrival time calculated at the calculating unit of an arrival time.

(2) The particle sorting apparatus according to (1) above, in which
the sorting control unit calculates an arrival time difference of former and latter particles, and determines that the particles are not recovered when the arrival time difference is under a threshold value.

(3) The particle sorting apparatus according to (1) or (2) above, in which
the light for detecting a speed has a wavelength different from a wavelength of the exited light.

(4) The particle sorting apparatus according to (3) above, in which
the calculating unit of the arrival time calculates the arrival time of each particle from the detection time difference between a scattered light derived from the excited light and the light derived from a scattered light for detecting a speed.

(5) The particle sorting apparatus according to any of (1) to (4) above, in which
the excited light irradiating unit includes two or more light sources emitting lights having different wavelengths.

(6) The particle sorting apparatus according to any of (1) to (5) above, in which
the sorting unit has a negative pressure suction unit being communicated with the flow path.

(7) The particle sorting apparatus according to (6) above, in which
the sorting control unit controls an operation of the negative pressure suction unit based on the data of the respective particles detected at the light detecting unit and the arrival time calculated at the calculating unit of an arrival time.

(8) The particle sorting apparatus according to any of (1) to (7) above, in which
the sorting control unit controls a timing to recover the particles by the sorting unit based on the data of the respective particles detected at the light detecting unit and the arrival time calculated at the calculating unit of an arrival time.

(9) A method of sorting particles, including:
irradiating an excited light to particles flowing through a flow path disposed within a microchip;
irradiating a light for detecting a speed to the particles at a position different from the excited light;
detecting a light emitted from the particles;
individually calculating an arrival time of each particle at a sorting unit disposed within the microchip and being communicating with the flow path from a detection time difference between the light derived from the excited light and the light derived from the light for detecting a speed; and
sort-controlling to determine whether or not the particles are recovered based on data of each particle detected by the light detection and the arrival time calculated by the arrival time calculation.

(10) The method of sorting particles according to (9) above, in which
the sorting control includes calculating an arrival time difference of former and latter particles, and determining that the particles are not recovered when the arrival time difference is under a threshold value.

(11) The method of sorting particles according to (9) or (10) above, in which
the light for detecting a speed having a wavelength different from a wavelength of the exited light is used.

(12) The method of sorting particles according to (11) above, in which
the calculation of the arrival time includes calculating the arrival time of each particle from the detection time difference between a scattered light derived from the excited light and a scattered light derived from the light for detecting a speed.

(13) The method of sorting particles according to any of (9) to (12) above, in which the irradiation of an excited light emits different wavelengths from two or more light sources.

(14) The method of sorting particles according to any of (9) to (13) above, in which
the sorting unit has a negative pressure suction unit being communicated with the flow path, and
the sorting control includes controlling an operation of the negative pressure suction unit based on the data of the respective particles detected by the light detection and the arrival time calculated by the arrival time calculation.

(15) The method of sorting particles according to any of (9) to (14) above, in which
the sorting control includes controlling a timing to recover the particles by the sorting unit based on the data of the respective particles detected by the light detection and the arrival time calculated by the arrival time calculation.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A particle sorting apparatus, comprising:
   a first light irradiating unit including a first mirror and a first light source for irradiating a first light to particles flowing through a flow path at a first position;
   a second light irradiating unit including a second mirror and a second light source configured to irradiate a second light to particles flowing through the flow path at a second position which is different from the first position;
   a light detecting unit is configured to detect a light emitted from the particles;
   a sorting unit; and
   a sorting control unit configured to control sorting of the particles based on data of the particles detected at the light detecting unit and an arrival time associated with a time difference between a light from the first light irradiating unit and a light from the second light irradiating unit;
   wherein the flow path and the sorting unit are provided within a microchip, and
   wherein the sorting control unit is configured to further control sorting of the particles based on a predetermined sorting mode.

2. The particle sorting apparatus according to claim 1, wherein the sorting control unit is configured to calculate an arrival time difference among the particles, and to determine that the particles are not recovered when the arrival time difference is under a threshold value.

3. The particle sorting apparatus according to claim 1, wherein
   the second light irradiated from the second light irradiating unit has a wavelength different from the first light irradiated from the first light irradiating unit.

4. The particle sorting apparatus according to claim 1 further comprising a calculation unit, wherein the calculation unit is configured to calculate the arrival time of the particles based on the time difference between a scattered light from the first light and a scattered light from the second light.

5. The particle sorting apparatus according to claim 1, wherein the first light irradiating unit includes two or more light sources.

6. The particle sorting apparatus according to claim 5, wherein the two or more light sources are configured to emit light at different wavelengths.

7. The particle sorting apparatus according to claim 1, wherein the sorting unit has a negative pressure suction unit.

8. The particle sorting apparatus according to claim 7, wherein the sorting control unit is configured to control an operation of the negative pressure suction unit based on the data of the particles detected at the light detecting unit and the arrival time.

9. The particle sorting apparatus according to claim 1, wherein the sorting control unit is configured to control a timing to recover the particles by the sorting unit based on the data of the particles detected at the light detecting unit and the arrival time.

10. The particle sorting apparatus according to claim 1, wherein the particles include one or more of a cell, a microorganism and a liposome.

11. The particle sorting apparatus according to claim 1, further comprising a feeding flow path for feeding a sample liquid containing the particles.

12. The particle sorting apparatus according to claim 1, further comprising a pair of flow paths for feeding a sheath liquid.

13. The particle sorting apparatus according to claim 1, wherein the light detecting unit includes a photo multiplier tube or an area imaging sensor, and wherein the area imaging sensor includes a CCD image sensor or a CMOS image sensor.

14. The particle sorting apparatus according to claim 1, wherein the light detecting unit is configured to detect one or more of a forward scattered light, a fluorescence, a side scattered light, a Rayleigh scattered light and a Mie scattered light.

15. The particle sorting apparatus according to claim 1 further comprising a calculation unit, wherein the calculation unit is configured to calculate an arrival time of each particle to a sorting unit, the arrival time is associated with a time difference between a light from the first light irradiating unit and a light from the second light irradiating unit.

16. The particle sorting apparatus according to claim 1, wherein the sorting control unit is configured to determine whether or not the particles are recovered based on the data of the particles detected at the light detecting unit and the arrival time.

17. The particle sorting apparatus according to claim 1, further comprising an output queue circuit configured to rearrange data of the particles in an arrival order to the sorting unit.

18. A particle sorting system, comprising:
   an optical system and a particle sorting apparatus,
      the particle sorting apparatus including
         a first light irradiating unit including a first mirror and a first light source for irradiating a first light to particles flowing through a flow path at a first position;
         a second light irradiating unit including a second mirror and a second light source configured to irradiate a second light to particles flowing through the flow path at a second position which is different from the first position;
         a light detecting unit configured to detect a light emitted from the particles;
         a sorting unit; and
         a sorting control unit configured to control sorting of the particles based on data of the particles detected at the light detecting unit and an arrival time associated with a time difference between a light from the first light irradiating unit and a light from the second light irradiating unit;

wherein the flow path and the sorting unit are provided within a microchip, and wherein the sorting control unit is configured to further control sorting of the particles based on a predetermined sorting mode.

19. A particle sorting method, comprising:

irradiating a first light from a first light irradiating unit including a first mirror and a first light source to particles flowing through a flow path at a first position;

irradiating a second light from a second light irradiating unit including a second mirror and a second light source to the particles at a second position which is different from the first position;

detecting a light emitted from the particles;

calculating an arrival time of the particles to a sorting unit based on a time difference between a light from the first light irradiating unit and a light from the second light irradiating unit; and controlling sorting of the particles to determine whether or not the particles are recovered based on data of the particles detected by the light detection and the arrival time, wherein the flow path and the sorting unit are provided within a microchip, and wherein the sorting control unit is configured to further control sorting of the particles based on a predetermined sorting mode.

20. The particle sorting apparatus according to claim 1, wherein the predetermined sorting mode is selected from at least an acquisition rate priority mode or a purity priority mode.

* * * * *